US005775764A

United States Patent [19]

Yamashita

[11] Patent Number: 5,775,764

[45] Date of Patent: Jul. 7, 1998

[54] WIRE TYPE TELEOPERATIONAL SYSTEM

[75] Inventor: Hideo Yamashita, Okazaki, Japan

[73] Assignee: Chuo Hatsujo Kabushiki Kaisha, Nagoya, Japan

[21] Appl. No.: 738,722

[22] Filed: Oct. 28, 1996

[30] Foreign Application Priority Data

Jan. 29, 1996 [JP] Japan .................................. 8-013078

[51] Int. Cl.[6] .................................................. B62D 25/10

[52] U.S. Cl. .............................................. 296/76; 74/471 R

[58] Field of Search ............................ 296/76; 74/471 R, 74/500.5, 502, 502.2, 502.4, 502.6; 292/DIG. 25

[56] References Cited

U.S. PATENT DOCUMENTS 4,526,057 7/1985 Mochida et al. ...................... 74/471 R

FOREIGN PATENT DOCUMENTS 58-24585 5/1983 Japan .............................. E05B 65/19
60-63658 5/1985 Japan .............................. E05B 65/19
62-52885 11/1987 Japan .............................. G05G 9/00
424045 6/1992 Japan .............................. E05B 65/19
727148 1/1995 Japan .............................. F16D 31/06
7271468 10/1995 Japan .............................. G05G 9/00

*Primary Examiner*—Jesus D. Sotelo
*Attorney, Agent, or Firm*—Donald S. Dowden; Cooper & Dunham LLP

[57] ABSTRACT

In a wire type teleoperational system, a push-pull cable has a push-pull inner cable which is at one end connected to an operative portion, and the other end connected to a coupler. The push-pull cable further has a push-pull outer cable which encases the push-pull inner cable so that one end of the push-pull outer cable is connected to a guide member which movably supports the coupler. A pull cable has a pull inner cable which is at one end connected to a first operative portion, and at the other end connected to the coupler, and the pull cable further has a pull outer cable which encases the pull inner cable so that one end of the pull outer cable is connected to a displacement member which is movably connected to the guide member. A push cable opposite the pull cable has a push inner cable which is at one end connected to a second operative portion, and at the other end connected to the displacement member, and the push cable further has a push outer cable which encases the push inner cable so that one end of the push outer cable is connected to the guide member. The guide member has an open ended outer cylinder, and the displacement member has an inner cylinder slidably mounted on the outer cylinder. The coupler is slidably placed within the outer cylinder so as to form a bifurcated joint.

2 Claims, 3 Drawing Sheets

WIRE TYPE TELEOPERATIONAL SYSTEM

BACKGROUND OF THE INVENTION

1. Field of the Invention

This invention relates to a wire type teleoperational system having a single push cable actuated in combination with two pull cables.

2. Description of the Prior Art

In a push-pull force transmission extraction device disclosed by Utility Model Publication No. 4-24045, one end of a single push-pull cable is connected to an operative member is adapted to reciprocally move from a neutral position. With the use of a manual operative member, two actuators are individually operated which are in turn mounted on a middle portion of an outer cable and the other end of the push-pull cable.

Meanwhile, another operational system has been introduced in which the operative member is secured to one end of a single pull cable, and two pull cables are connected to the other end of the operative member. With the use of a return spring, the two operative members are individually operated which are connected to a front end of the two pull cables.

In the former system, however, it is difficult to flexibly arrange the cable, and thereby reducing a directional degree in which the cable is oriented due to the push-pull cable of higher rigidity.

In the latter system, necessity of the return spring requires an operational force with an increased number of assemble part components.

Therefore, it is one of the objects of the invention to provide a wired teleoperational system which is capable of being actuated with a less operational force, and is easy to mount cables and operational members with an decreased number of assemble part components.

SUMMARY OF THE INVENTION

According to the present invention, there is provided a wire type teleoperational system comprising: a push-pull cable including a push-pull inner cable which is at one end connected to an operative portion, and the other end connected to a coupler, and at the push-pull cable further including a push-pull outer cable which encases the push-pull inner cable so that one end of the push-pull outer cable is connected to a guide member which movably supports the coupler; a pull cable including a pull inner cable which is at one end connected to a first operative portion, and at the other end connected to the coupler, and the pull cable further including a pull outer cable which encases the pull inner cable so that one end of the pull outer cable is connected to a displacement member which is movably connected to the guide member; and a push cable placed opposite to said pull cable and including a push inner cable which is at one end connected to a second operative portion, and at the other end connected to the displacement member, and the push cable further including a push outer cable which encases the push inner cable so that one end of the push outer cable is connected to the guide member.

According to another aspect of the present invention, the guide member has an open ended outer cylinder, and said displacement member has an inner cylinder which is slidably mounted on said outer cylinder, and said coupler is slidably placed within said outer cylinder so as to form a bifurcated joint.

According to other aspect of the present invention, the operative portion is a manual lever, and the first operative portion is a fuel inlet opener, and the second operative portion is a trunk door opener for an automotive vehicle.

With a limited use of the push-pull cable of high rigidity, and the two opposed pull cables of high flexibility connected to one end of the push-pull, it is possible to provide a wired teleoperational system which is capable of being actuated with a less operational force, and is easy to mount cables and operational members with an decreased number of assemble part components.

BRIEF DESCRIPTION OF THE DRAWINGS

These and other objects, aspect and embodiments of the invention will be described in more detail with reference to the following drawing figures, of which.

DETAILED DESCRIPTION OF PREFERRED EMBODIMENTS OF THE INVENTION

Figure 1:
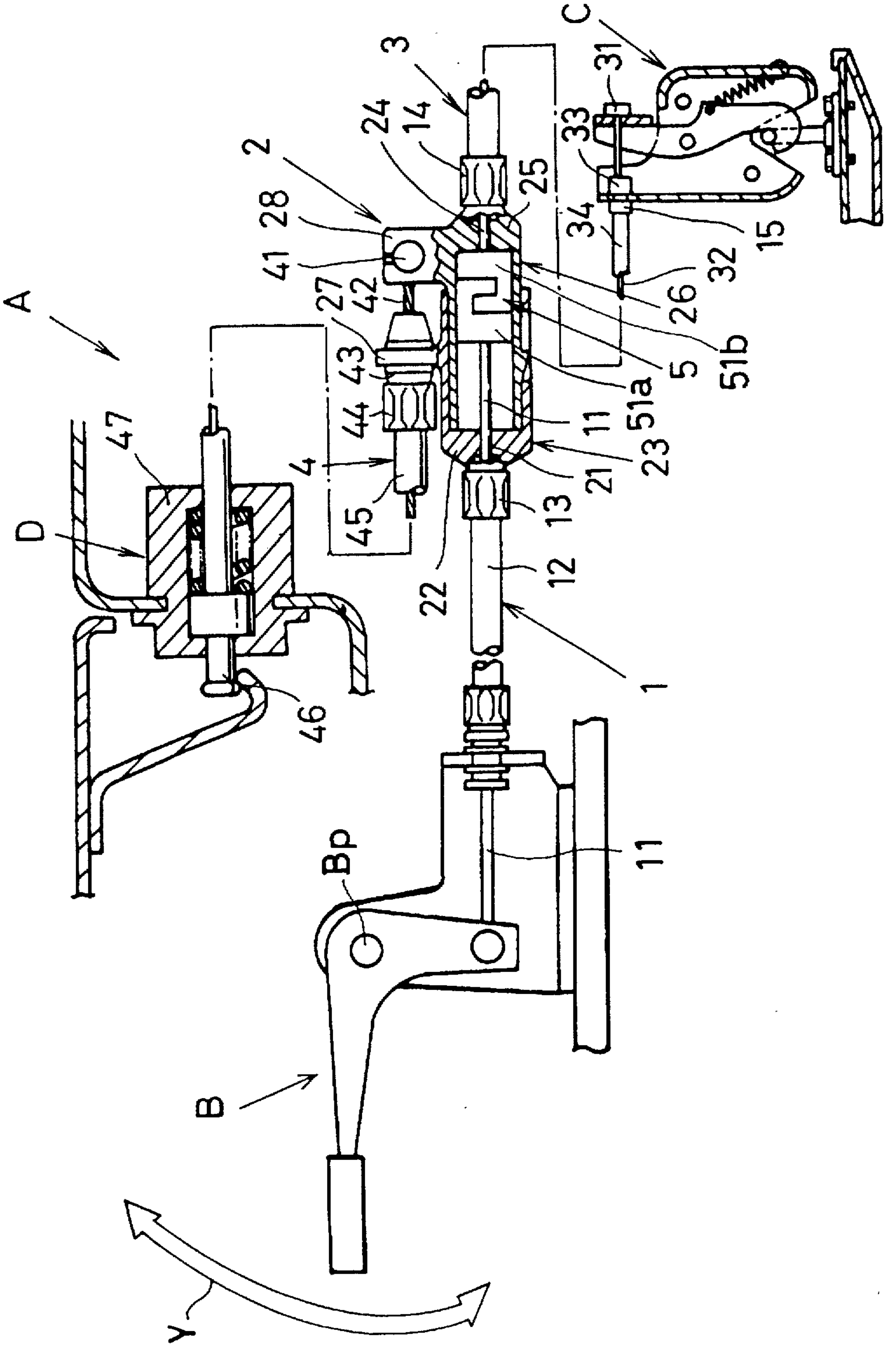
FIG. 1 is a longitudinal cross sectional view of a wired teleoperational system to an embodiment of the invention.

Referring first to FIG. 1 which shows a wired teleoperational system (A) having a push-pull cable 1, a pull cable 3 connected to a bifurcated joint coupler 2. To the bifurcated joint coupler 2, a push cable 4 is connected which is located opposite to the pull cable 3.

Figure 3:
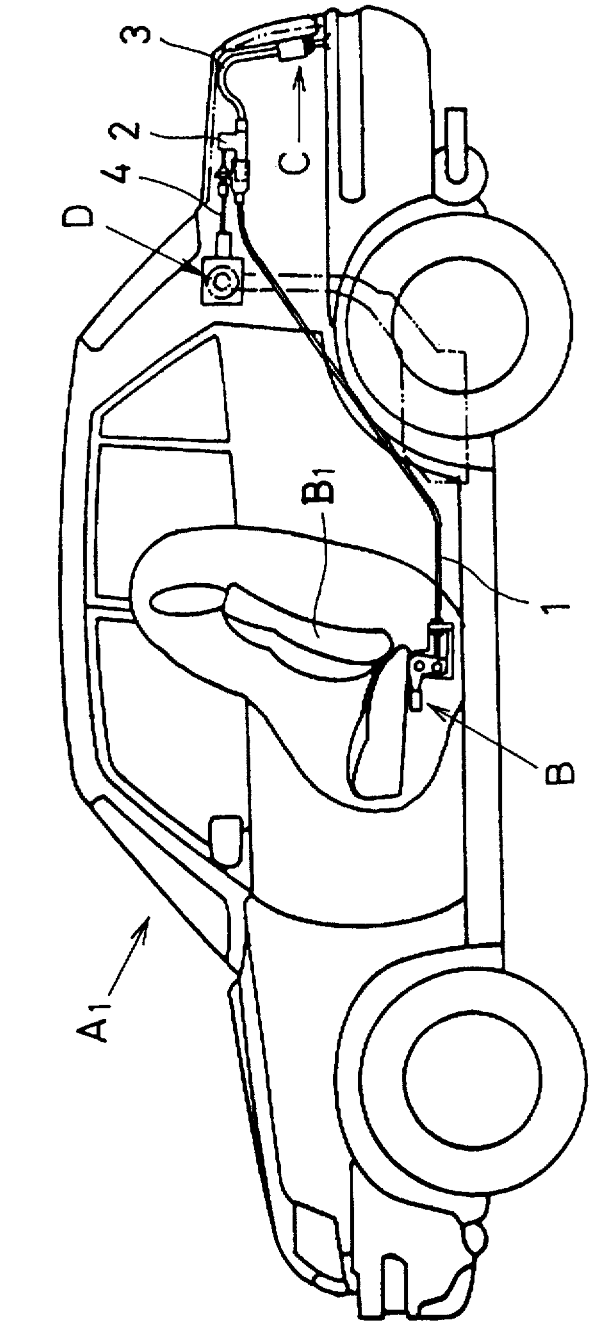
FIG. 3 is a schematic view of an automotive vehicle into which the wired teleoperational system is incorporated.

As shown in FIG. 3, one end of the push-pull cable 1 of the teleoperational system (A) is connected to a manual lever (B) located in the proximity of a driver's seat (B1) of an automotive vehicle (A1). The other end of the pull cable 3 is connected to a trunk room door opener (C) which serves as a first operational element, while the other end of the push cable 4 connected to a fuel inlet opener (D) which serves as a second operational element.

The push-pull cable 1 has a push-pull inner cable 11 pivotably connected to one end of the manual lever (B) which is reciprocally movable around a pin (Bp) in a direction of a double headed arrow Y. The push-pull inner cable 11 is encased by a push-pull outer cable 12 whose one end is secured to a stationary member.

One end of the bifurcated joint coupler 2 forms a side wall 22 which has a passage hole 21 through which the push-pull inner cable 11 passes. From the side wall 22, an open-ended cylindrical guide member 23 is integrally extended. Within the cylindrical guide member 23, a cylindrical displacement member 26 is slidably placed with its open end opposed the open end of the guide member 23. A closed end of the displacement member 26 forms a side wall 25 a passage hole 24 through which a pull inner cable passes. Within the cylindrical guide member 23 and the displacement member 26, a coupler 5 is slidably encased.

On an outer surface of the cylindrical guide member 23, a U-shaped claw 27 is mounted. On an outer surface of the cylindrical displacement member 26, an anchor bracket 28 is placed in a relationship to face the claw 27. The coupler 5 has a pair of columns **51*a*, 51*b* each of which is notched to be substantially L-shaped in cross section. The paired columns 51*a*, 51*b* are brought into engagement with each other through their notched portions. The coupler 5 is defined by the paired columns 51*a*, 51*b*** because of the convenience of assembling them.

The other end of the push-pull outer cable 12 is connected to the side wall 22 of the guide member 23 by means of a caulking ring 13. The other end of the push-pull inner cable 11 is connected to the column 51*a* of the coupler 5 through the passage hole 21.

The pull cable 3 has a pull inner cable 32 which is connected at one end to the column 51*b* of the coupler 5 through the passage hole 24, and at the other end to a cable end 31 which is to actuate the first operational member (C). The pull cable 3 further has a pull outer cable 34 which is connected at one end to the side wall 25 of the displacement member 26 by means of a caulking ring 14, and at the other end to a casing cap 33 secured to a staionary member by means of a caulking ring 15.

The push cable 4 has a push inner cable 42 which is connected at one end to a cable end pin 41 interfit into a hole of the anchor bracket 28, and at the other end to the fuel inlet opener (D) for the automotive vehicle. The push cable 4 further has a push outer cable 45 which the claw 27 firmly hold in position by a casing cap 43 and a caulking ring 44 so as to encase the push inner cable 42. The other end of the push inner cable 42 is connected to a cable end 46, while the other end of the push outer cable 45 is shrouded by a cylindrical opener housing 47.

Figure 2A:
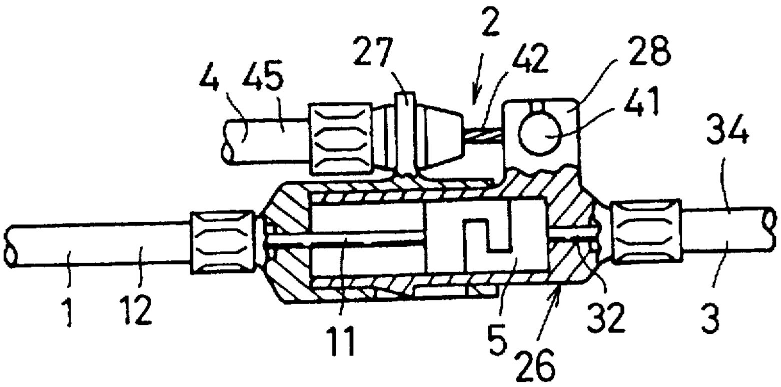
FIGS. 2*a*–2*c* are enlarged longitudinal cross sectional views of a bifurcated joint coupler.
Figure 2B:
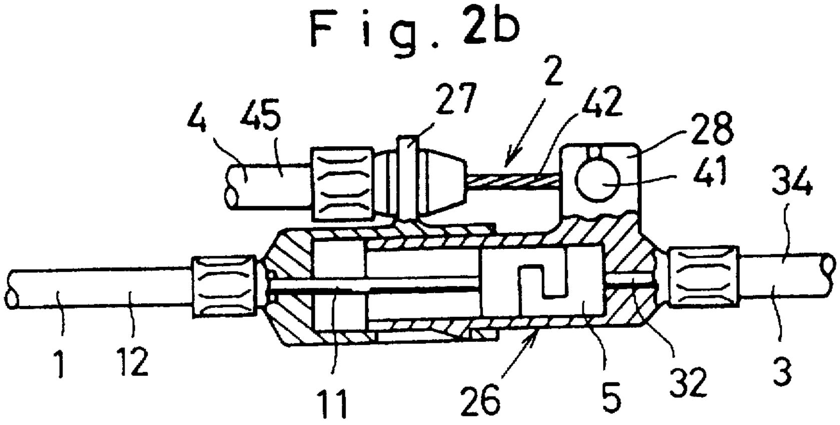

In so doing, when the manual lever (B) of the wired teleoperational system (A) is in the neutral position, the bifurcated joint coupler 2 is in a position as shown by FIG. 2*a*. A downward movement of the manual lever (B) permits the push-pull inner cable 11 to act as a push inner cable so as to move the displacement member 26 in the right direction by way of the coupler 5 as shown in FIG. 2*b*, and thereby moving the push inner cable 42 rightward to actuate the fuel inlet opener (D) so as to open the fuel inlet of the automotive vehicle.

Figure 2C:
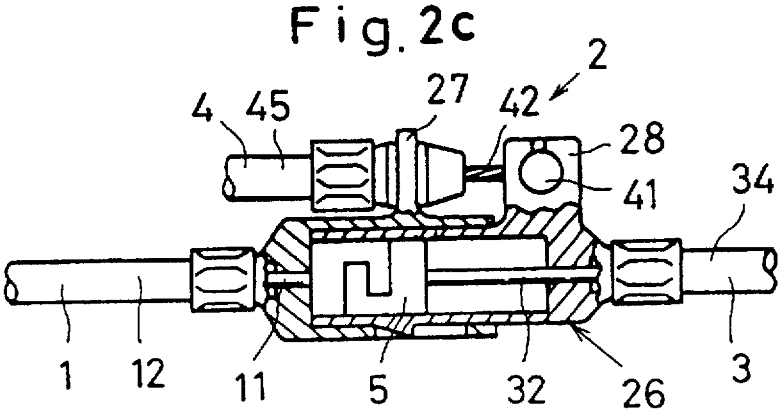

With an upward operation of the manual lever (B) from the neutral position of FIG. 2*a*, the push-pull inner cable 11 acts as a pull inner cable so as to move the displacement member 26 in the left direction by way of the coupler 5 as shown in FIG. 2*c*, and thereby moving the pull inner cable 32 leftward to actuate the trunk room door opener (C) so as to open the trunk room door of the automotive vehicle.

It is noted that the pull inner cables 32, 32 may be directly connected with no coupler 5 interposed therebetween. In this instance in which the coupler 5 is omitted, the pivotal movement stop may be provided with the manual lever to provide a detent and break away feeling upon moving the manual lever.

While the invention has been described with reference to the specific embodiments, it is understood that this description is not to be construed in a limiting sense in as much as various modifications and additions to the specific embodiments may be made by skilled artisans without departing from the scope of the invention.

What is claimed is:

1. A wire type teleoperational system comprising:

a push-pull cable including a push-pull inner cable which is at one end connected to an operative portion, and the other end connected to a coupler, and the push-pull cable further including a push-pull outer cable which encases the push-pull inner cable so that one end of the push-pull outer cable is connected to a guide member which movably supports said coupler;

a pull cable including a pull inner cable which is at one end connected to a first operative portion, and at the other end connected to said coupler, and the pull cable further including a pull outer cable which encases the pull inner cable so that one end of the pull outer cable is connected to a displacement member which is movably connected to said guide member; and a push cable placed opposite to said pull cable and including a push inner cable which is at one end connected to a second operative portion, and at the other end connected to said displacement member, and the push cable further including a push outer cable which encases the push inner cable so that one end of the push outer cable is connected to said guide member;

wherein said guide member has an open ended outer cylinder, and said displacement member has an inner cylinder which is slidably mounted on said outer cylinder, and said coupler is slidably placed within said outer cylinder so as to form a bifurcated joint.

2. A wire type teleoperational system as recited in claim 1, wherein said operative portion is a manual lever, and said first operative portion is a fuel inlet opener, and said second operative portion is a trunk door opener for an automotive vehicle.

* * * * *